(12) United States Patent
Chang et al.

(10) Patent No.: US 11,133,532 B2
(45) Date of Patent: Sep. 28, 2021

(54) MEMBRANE-ELECTRODE ASSEMBLY FOR LITHIUM BATTERY, METHOD OF MANUFACTURING THE SAME, AND LITHIUM BATTERY INCLUDING THE SAME

(71) Applicants: Samsung Electronics Co., Ltd., Suwon-si (KR); Samsung SDI Co., Ltd., Yongin-si (KR)

(72) Inventors: Wonseok Chang, Seoul (KR); Hyorang Kang, Anyang-si (KR); Toshinori Sugimoto, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 349 days.

(21) Appl. No.: 16/230,878

(22) Filed: Dec. 21, 2018

(65) Prior Publication Data

US 2019/0214685 A1 Jul. 11, 2019

(30) Foreign Application Priority Data

Jan. 5, 2018 (KR) .......................... 10-2018-0001848

(51) Int. Cl.
*H01M 10/0585* (2010.01)
*H01M 10/052* (2010.01)
(Continued)

(52) U.S. Cl.
CPC ....... *H01M 10/0585* (2013.01); *H01M 4/134* (2013.01); *H01M 4/382* (2013.01);
(Continued)

(58) Field of Classification Search
CPC ........... H01M 10/0585; H01M 10/052; H01M 10/0565; H01M 10/0566; H01M 4/382;
(Continued)

(56) References Cited

U.S. PATENT DOCUMENTS 5,688,293 A * 11/1997 Oliver ............... H01M 10/0565
29/623.1
9,099,756 B2 8/2015 Choi et al.
(Continued)

FOREIGN PATENT DOCUMENTS

JP 2001052742 A 2/2001
KR 100430767 B1 4/2004
(Continued)

*Primary Examiner* — Osei K Amponsah
(74) *Attorney, Agent, or Firm* — Cantor Colburn LLP

(57) ABSTRACT

A membrane-electrode assembly for a lithium battery includes: a cathode including a cathode current collector and a composite cathode active material layer on the cathode current collector, wherein the composite cathode active material layer includes a cathode active material and a first electrolyte including a high concentration lithium salt and a first ionic liquid; an electrolyte reservoir layer on a surface of the cathode, wherein the electrolyte reservoir layer includes a second electrolyte including a polymer and a second ionic liquid; and a solid electrolyte on a surface of the electrolyte reservoir layer.

20 Claims, 4 Drawing Sheets

(51) Int. Cl.
*H01M 10/0565* (2010.01)
*H01M 10/0566* (2010.01)
*H01M 4/38* (2006.01)
*H01M 10/0569* (2010.01)
*H01M 10/0562* (2010.01)
*H01M 4/134* (2010.01)
*H01M 10/0525* (2010.01)
*H01M 10/0568* (2010.01)
*H01M 4/40* (2006.01)
*H01M 50/411* (2021.01)
*H01M 50/449* (2021.01)

(52) U.S. Cl.
CPC ......... *H01M 4/405* (2013.01); *H01M 10/052* (2013.01); *H01M 10/0525* (2013.01); *H01M 10/0562* (2013.01); *H01M 10/0565* (2013.01); *H01M 10/0566* (2013.01); *H01M 10/0568* (2013.01); *H01M 10/0569* (2013.01); *H01M 50/411* (2021.01); *H01M 50/449* (2021.01); H01M 2300/0025 (2013.01); H01M 2300/0065 (2013.01); H01M 2300/0085 (2013.01); H01M 2300/0091 (2013.01); H01M 2300/0094 (2013.01)

(58) Field of Classification Search
CPC ............. H01M 2/1653; H01M 2/1686; H01M 2300/0085; H01M 2300/0094; H01M 2300/0065; H01M 2300/0091; H01M 2300/0025
See application file for complete search history.

(56) References Cited

U.S. PATENT DOCUMENTS

| | | | |
|---|---|---|---|
| 9,543,617 | B2 | 1/2017 | Siret et al. |
| 9,799,922 | B2 | 10/2017 | Park et al. |
| 2005/0081370 | A1 | 4/2005 | Kurihara et al. |
| 2005/0175903 | A1 | 8/2005 | Kim et al. |
| 2013/0280579 | A1 | 10/2013 | Wright et al. |
| 2014/0072881 | A1 | 3/2014 | Park et al. |
| 2016/0064770 | A1* | 3/2016 | Lee ............... H01M 10/056 429/303 |
| 2017/0222244 | A1* | 8/2017 | Kim .................. H01M 10/0565 |
| 2019/0214671 | A1 | 7/2019 | Chang et al. |

FOREIGN PATENT DOCUMENTS

| | | |
|---|---|---|
| KR | 100502357 B1 | 7/2005 |
| KR | 100671186 B1 | 1/2007 |
| KR | 1020070024886 A | 3/2007 |
| KR | 1020110058657 A | 6/2011 |
| KR | 1020110069455 A | 6/2011 |
| KR | 1020130008830 A | 1/2013 |
| KR | 101233829 B1 | 2/2013 |
| KR | 1020140036413 A | 3/2014 |
| KR | 1020140046611 A | 4/2014 |
| KR | 1020150115526 A | 10/2015 |
| KR | 102005448 B1 | 7/2019 |
| KR | 1020190083877 A | 7/2019 |

* cited by examiner

MEMBRANE-ELECTRODE ASSEMBLY FOR LITHIUM BATTERY, METHOD OF MANUFACTURING THE SAME, AND LITHIUM BATTERY INCLUDING THE SAME

CROSS-REFERENCE TO RELATED APPLICATION

This application claims priority to and the benefit of Korean Patent Application No. 10-2018-0001848, filed on Jan. 5, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a membrane-electrode assembly for a lithium battery, a method of manufacturing the membrane-electrode assembly, and a lithium battery including the membrane-electrode assembly.

2. Description of the Related Art

Lithium secondary batteries are high-performance batteries having the highest energy density compared to other types of secondary batteries, and are applicable to various types of electronic devices, such as electric vehicles, for example.

A lithium secondary battery may include a cathode having a high energy density. To ensure the safety of a lithium secondary battery including such a high-energy density cathode, the use of a high-viscosity liquid electrolyte has been investigated. However, it is difficult to impregnate the cathode with a high-viscosity liquid electrolyte, and the high-viscosity liquid electrolyte may not have satisfactory ion mobility. Therefore, there is a need for further improvement in this regard.

SUMMARY

Provided are a membrane-electrode assembly for a lithium battery and a method of manufacturing the membrane-electrode assembly.

Provided is a lithium battery including the membrane-electrode assembly for a lithium battery.

Additional aspects will be set forth in part in the description which follows and, in part, will be apparent from the description, or may be learned by practice of the presented embodiments.

According to an aspect of an embodiment, a membrane-electrode assembly (MEA) for a lithium battery includes: a cathode comprising a cathode current collector and a composite cathode active material layer on the cathode current collector, wherein the composite cathode active material layer includes a cathode active material and a first electrolyte comprising a lithium salt and a first ionic liquid; an electrolyte reservoir layer on a surface of the cathode, wherein the electrolyte reservoir layer includes a second electrolyte including a polymer and a second ionic liquid; and a solid electrolyte on a surface of the electrolyte reservoir layer.

According to an aspect of another embodiment, a lithium battery includes: the membrane-electrode assembly; a composite electrolyte on the membrane-electrode assembly, the composite electrolyte comprising at least one of lithium metal and a lithium metal alloy, and a liquid electrolyte; and an anode current collector on the composite electrolyte.

Also disclosed is a lithium battery including the membrane-electrode assembly, an anode active material layer on the membrane-electrode assembly; and an anode current collector on the anode active material layer.

According to an aspect of another embodiment, a method of manufacturing the membrane-electrode assembly includes: providing a cathode active material layer on a cathode current collector; vacuum-impregnating a first electrolyte composition into the cathode active material layer, wherein the first electrolyte composition comprises the first ionic liquid, a sacrificial solvent, and the lithium salt and removing the sacrificial solvent to form a composite cathode active material layer; disposing an electrolyte reservoir layer composition onto a surface of the composite cathode active material layer to form an electrolyte reservoir layer including the second electrolyte, wherein the electrolyte reservoir layer composition includes a mixture of the polymer and the second ionic liquid; and disposing a solid electrolyte on a surface of the electrolyte reservoir layer to manufacture the membrane-electrode assembly.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
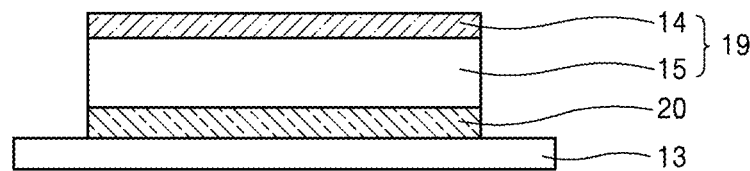
FIG. 1 is a schematic view illustrating a structure of a membrane-electrode assembly for a lithium battery, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. As used herein, the term "and/or" includes any and all combinations of one or more of the associated listed items. Expressions such as "at least one of," when preceding a list of elements, modify the entire list of elements and do not modify the individual elements of the list. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a membrane-electrolyte assembly for a lithium battery, a method of manufacturing the membrane-electrolyte assembly, a lithium battery including the membrane-electrolyte assembly, and a method of manufacturing the lithium battery will be described in detail.

In accordance with an aspect of the disclosure, a membrane-electrode assembly (MEA) for a lithium battery includes: a cathode including a cathode current collector and a composite cathode active material layer on the current collector, wherein the composite cathode active material layer includes a cathode active material and a first electrolyte including a lithium salt and a first ionic liquid; an electrolyte reservoir layer on a surface of the composite cathode, the electrolyte reservoir layer including a second electrolyte including a polymer and a second ionic liquid; and a solid electrolyte on a surface of the electrolyte reservoir layer.

A concentration of the lithium salt in the first electrolyte is about 1.3 molar (M) or greater.

Figure 2A:
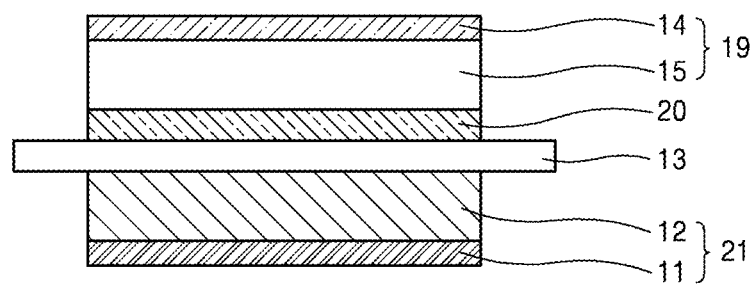
FIG. 2A is a schematic view illustrating a structure of a lithium battery including the membrane-electrode assembly, according to an embodiment.
Figure 2B:
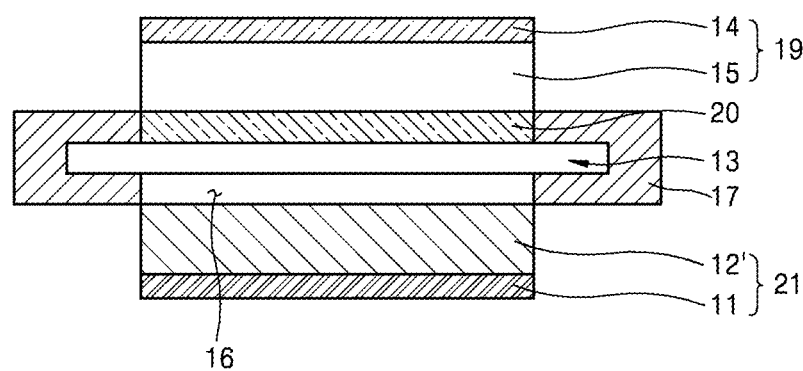
FIG. 2B is a schematic view illustrating a structure of a lithium battery including the membrane-electrode assembly, according to another embodiment.

Embodiments of the membrane-electrolyte assembly for a lithium battery and a lithium battery including the membrane-electrolyte assembly will be described with reference to FIGS. 1, 2A, and 2B. FIG. 1 illustrates a structure of a membrane-electrode assembly for a lithium battery, according to an embodiment. FIGS. 2A and 2B illustrate structures of lithium batteries including the membrane-electrolyte assembly, according to an embodiment.

Referring to FIG. 1, a membrane-electrode assembly according to an embodiments includes a cathode 19. The cathode 19 includes a composite cathode active material layer 15 on a surface of a cathode current collector 14, the composite cathode active material layer 15 including a cathode active material and a first electrolyte. An electrolyte reservoir layer 20 containing a second electrolyte is on a surface of the cathode 19. The first electrolyte in the composite cathode active material layer 15 is a high-viscosity electrolyte containing a lithium salt at a high concentration of about 1.3 M or greater and a first ionic liquid.

A concentration of the lithium salt in the first electrolyte may be, for example, about 1.3 M to about 10 M, or about 2 M to about 8 M, and in some embodiments, about 2 M to about 5 M. The first electrolyte may provide improved safety to the membrane-electrode assembly due to the inclusion of the first ionic liquid, and may have an improved ability to impregnate the cathode active material layer by using a sacrificial solvent together in forming the cathode 19.

A solid electrolyte 13 may separate the cathode 19 and an anode from one another.

When the solid electrolyte 13 is a liquid-impermeable ion-conductive separator membrane, the solid electrolyte 13 may allow passage of lithium ions, and block the passage or permeation of the first electrolyte and the second electrolyte of the composite cathode and an electrolyte of the anode. When the first ionic liquid is included in the composite cathode active material layer 15 of the cathode 19, a lithium battery including the cathode 19 may have increased resistance during operation. Without being limited by theory, it is understood that the increased resistance during operation occurs because the first ionic liquid may not fill the spaces between active material particles due to an intrinsic viscosity of the first ionic liquid. An electrolyte containing the first ionic liquid may lower the mobility of lithium ions a significant amount due to the relatively high viscosity of the first ionic liquid. In addition, the electrolyte containing the first ionic liquid may not effectively impregnate into a cathode having a high energy density during a cell assembly and electrolyte injection process, and thus may fail to ensure safety of the membrane-electrode assembly.

However, according to an embodiment, the first electrolyte may be impregnated in the cathode active material layer 15 under vacuum, together with a sacrificial solvent, to improve the ability of the ionic liquid to impregnate the cathode active material layer 15. At the same time, when the electrolyte reservoir layer 20 is disposed on a surface of the cathode 19, the electrolyte reservoir layer 20 may provide additional electrolyte solution to the cathode 19 and at the same time prevent the electrolyte impregnated in the composite cathode active material layer 15 from leaking out of the cathode 19, and thus can stabilize the interface between the solid electrolyte 13 and the cathode 19.

The electrolyte reservoir layer 20 may contain a second electrolyte including a second ionic liquid and a polymer. For example, the amount of the second ionic liquid may be about 50 parts by weight to about 95 parts by weight, and in an embodiment, about 50 parts by weight to about 95 parts by weight, and in another embodiment, about 80 parts by weight to about 95 parts by weight, based on a total weight of the second ionic liquid and the polymer.

The polymer may be a non-ionically conductive polymer. As used herein, the term "non-ionically conductive polymer" refers to a polymer having substantially no ionic conductivity. The polymer may include, for example, polyvinylindene fluoride, a vinylidene fluoride-hexafluoropropylene copolymer, a styrene-butadiene rubber, polyvinyl alcohol, polyurethane, polyamideimide (PAI), or a combination thereof.

The electrolyte reservoir layer 20 may further include a lithium salt and an organic solvent. For example, the concentration of the lithium salt may be about 1.3 M or greater, and in some embodiments, about 2 M to about 8 M, and in some other embodiments, about 2 M to about 5 M, and in still other embodiments, about 2 M to about 4 M.

The electrolyte reservoir layer 20 may have a thickness of about 1 micrometer (μm) to about 10 μm, and in some embodiments, about 1.5 μm to about 9.5 μm, and in some other embodiments, about 2 μm to about 9 μm. When the electrolyte reservoir layer 20 has a thickness within these ranges, an interfacial resistance between the solid electrolyte 13 and the composite cathode 19 may be reduced.

A lithium battery according to an embodiment may be manufactured by adhering together the membrane-electrode assembly of FIG. 1 and an anode 21 of FIG. 2A. The lithium battery according to an embodiment may be, for example, a lithium metal battery, or a lithium ion battery.

Referring to FIG. 2A, the anode 21 may include an anode current collector 11 and an anode active material layer 12 on the anode current collector 11. The anode active material layer 12 may include any anode active material suitable for use in a lithium battery.

Referring to FIG. 2B, the lithium battery according to an embodiment may have, instead of the anode 21 of FIG. 2A, a structure in which a composite electrolyte 12' is disposed on a surface of the anode current collector 11. When a lithium battery includes the composite electrolyte 12', the lithium battery may have an anodeless structure.

The lithium battery according to an embodiment may be, for example, an anodeless lithium battery. As used herein, the term "anodeless lithium metal battery" refers to: i) a lithium metal battery without an anode active material that incorporates and deincorporates, e.g., intercalates and deintercalates lithium ions, ii) a lithium metal battery having, on an anode current collector, a lithium metal thin film or a lithium metal alloy thin film having a thickness of about 10% or less with respect to a thickness of a cathode, as an anode, or iii) a lithium metal battery without an anode active material layer when the battery is assembled. The expression "thickness of the anode" may refer to a total thickness of the anode current collector and the anode active material layer.

The composite electrolyte 12' may include at least one of lithium metal and a lithium metal alloy, and a liquid electrolyte. An anodeless lithium metal battery may be manufactured using the composite electrolyte 12'.

Referring to FIG. 2B, a porous polymer membrane 16 may be between the solid electrolyte 13 and the composite electrolyte 12'. The porous polymer membrane 16 may block electrochemical contact between the solid electrolyte 13 and the composite electrolyte 12'.

Figure 3:
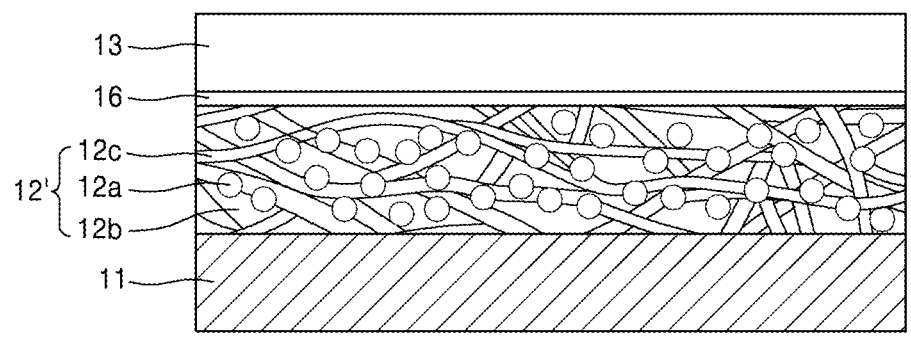
FIG. 3 illustrates the structure of a composite electrolyte and a solid electrolyte when the lithium battery of FIG. 2B is an anodeless lithium metal battery.

Referring to FIG. 3, the composite electrolyte 12' according to an embodiment may include a metal particle 12a of at least one of lithium metal and/or a lithium metal alloy, the metal particle 12a being dispersed in a liquid electrolyte 12b. The composite electrolyte 12' may further include a non-woven fabric 12c. The non-woven fabric 12c may support the liquid electrolyte 12b and the metal particle 12a. For example, when the anode current collector 11 is a mesh type, the non-woven fabric 12c may be omitted.

The composite electrolyte 12' may have a thickness of about 10 μm to about 150 μm. The at least one of lithium metal and a lithium metal alloy may be, for example, lithium metal powder, lithium metal alloy powder, or a combination thereof.

The non-woven fabric 12c may have a porosity of about 10% to about 90%, and in some embodiments, about 10% to about 80%, and in some other embodiments, about 10% to about 50%, or about 15 vol. % to about 40 vol. %, and in some other embodiments, about 25 volume percent (vol. %) to about 50 vol. %, and may have an average pore size of about 0.1 μm to about 10 μm, and in some embodiments, about 0.01 μm to about 8 μm, and in some other embodiments, about 0.1 μm to about 1.0 μm.

The non-woven fabric 12c may include cellulose, a polyester (for example, polyethylene terephthalate (PET)), polyetherimide, polyethylene, polypropylene, polyethylene terephthalate, polybutylene terephthalate, polyamide, polyacetal, polycarbonate, polyimide, polyether ketone, polyether sulfone, polyphenylene oxide, polyphenylene sulfide, polyethylene naphthalate, polytetrafluoroethylene, polyvinylidene fluoride, polyvinyl chloride, polyacrylonitrile, nylon, polyparaphenylene benzobisoxazole, or a combination thereof.

The liquid electrolyte 12b may be uniformly distributed in the composite electrolyte 12'. The liquid electrolyte 12b may include a lithium salt and an organic solvent. The lithium salt and the organic solvent may be any material suitable for use in a lithium battery. The concentration of the lithium salt may be about 1 M to about 8 M, about 1.3 M to about 10 M, and in some embodiments, about 2 M to about 5 M, and in some other embodiments, about 2 M to 4 M.

The liquid electrolyte 12b may be, for example, an electrolyte solution having a high-concentration of the lithium salt. For example, the high-concentration electrolyte solution may be an electrolyte solution containing a lithium salt in a concentration of about 1.3 M to about 10 M, about 2 M to about 8 M, and in some embodiments, about 2 M to about 5 M, and in some other embodiments, about 2 M to 4 M.

As illustrated in FIG. 2B, the porous electrolyte membrane 16 may be disposed between the solid electrolyte 13 and the composite electrolyte 12' to block electrochemical contact between them.

The porous polymer membrane 16 may have a thickness of about 5 μm to about 30 μm, and in some embodiments, about 5 μm to about 25 μm, or about 10 μm to about 20 μm. The porous polymer membrane 16 may include a polyethylene membrane, a polypropylene membrane, a polyethylene terephthalate membrane, a polybutylene terephthalate membrane, a polyester membrane, a polyacetal membrane, a polyamide membrane, a polycarbonate membrane, a polyimide membrane, a polyether ketone membrane, a polyether sulfone membrane, a polyphenylene oxide membrane, a polyphenylene sulfide membrane, a polyethylene naphthalate membrane, or a combination thereof.

Referring to FIG. 2B, a barrier 17 for protecting the composite electrolyte 12' may be included. The barrier 17 may have any suitable structure, and is not limited to the structure of FIG. 2B, provided that it protects the composite electrolyte 12'. The barrier 17 may be formed of, for example, a material for a battery case (e.g., a pouch). In an embodiment, the porous polymer membrane 16 and the barrier 17 may be omitted.

The solid electrolyte 13 may block the first electrolyte in the composite cathode 19 from migrating toward the composite electrolyte 12'. Also, the solid electrolyte 13 may block the liquid electrolyte of the composite electrolyte 12' from migrating toward the composite cathode 19.

The solid electrolyte 13 may be in a solid or semi-solid form. The solid electrolyte 13 may separate the anode 21 or the composite electrolyte 12' from the cathode 19. Accordingly, the lithium battery according to an embodiment may comprise separate cells. The solid electrolyte 13 may allow the passage of only lithium ions, and may block the passage or permeation of a liquid, for example.

The solid electrolyte 13 may be an inorganic solid electrolyte, an organic solid electrolyte, an organic/inorganic composite electrolyte, or a combination thereof. The organic solid electrolyte may include, for example, a polyethylene derivative, a polyethylene oxide derivative, a polypropylene oxide derivative, a phosphoric acid ester polymer, polyester sulfide, polyvinyl alcohol, polyvinylidene fluoride, or a combination thereof. The inorganic solid electrolyte may include, for example, a glass active metal ionic conductor, an amorphous active metal ionic conductor, a ceramic active metal ionic conductor, a glass-ceramic active metal ionic conductor, or a combination thereof. The organic/inorganic composite electrolyte may be, for example, a combination of an organic solid electrolyte and an inorganic solid electrolyte as listed above.

The solid electrolyte may include $Li_{1+x}Ti_{2-x}Al(PO_4)_3$ (LTAP) (wherein 0≤x<4), a Li—Ge—P—S based material, $Li_{1+x+y}Al_xTi_{2-x}Si_yP_{3-y}O_{12}$ (wherein 0<x<2 and 0≤y<3), $BaTiO_3$, $Pb(Zr_{(1-a)}Ti_a)O_3$ (PZT) (wherein a is 0≤a≤1), $Pb_{1-x}La_xZr_{1-y}Ti_yO_3$ (PLZT) (wherein 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein 0<x<2, and 0<y<3), lithium aluminum titanium phosphate ($Li_xAl_yTi_z(PO_4)_3$, wherein 0<x<2, 0<y<1, and 0<z<3), $Li_{1+x+y}(Al_{(1-a)}Ga_a)_x(Ti_{(1-b)}Ge_b)_{2-x}Si_yP_{3-y}O_{12}$ (wherein 0≤x≤1, 0≤y≤1, 0≤a≤1, and 0≤b≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitride ($Li_xN_y$, wherein 0<x<4 and 0<y<2), a $SiS_2$ glass ($Li_xSi_yS_z$, wherein 0<x<3, 0<y<2, and 0<z<4), a $P_2S_5$ glass ($Li_xP_yS_z$, wherein 0<x<3, 0<y<3, and 0<z<7), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein 0<x<5 and M includes Te, Nb, Zr, or a combination thereof); or a combination thereof.

The solid electrolyte may include, for example, a membrane including $Li_{1.4}Ti_{1.6}Al_{0.4}P_3O_{12}$, $Li_{1.3}Ti_{1.7}Al_{0.3}P_3O_{12}$, $Li_{10}GeP_2S_{12}$, $Li_7La_3Zr_2O_{12}$ (LLZO), $Li_2PO_3$ (LiPON), $Li_5La_3Ta_2O_{12}$, $La_{0.33}La_{0.55}TiO_3$, $Li_{1.5}Al_{0.5}Ge_{1.5}P_3O_{12}$, $Li_3BO_3$, $Li_4SiO_4$—$Li_3PO_4$, $Li_4SiO_4$, $Li_{1/3}La_{1/3}TiO_3$, $Li_2O$—$Al_2O_3$—$SiO_2$—$P_2O_5$—$TiO_2$—$GeO_2$, or a combination thereof.

The solid electrolyte may have a thickness of about 10 μm to about 150 μm, and in some embodiments, about 15 μm to about 90 μm, and in some other embodiments, about 20 μm to about 50 μm.

The anode active material forming the anode active material layer may include, for example, a carbonaceous material, silicon, a silicon oxide, a silicon-based alloy, a silicon-carbonaceous material composite, tin, a tin-based alloy, a tin-carbon composite, a metal/metalloid alloyable with lithium, an alloy thereof, an oxide thereof, or a combination thereof.

The carbonaceous material may be crystalline carbon, amorphous carbon, or a combination thereof. Examples of the crystalline carbon may include graphite such as natural graphite or artificial graphite in non-shaped, disc-shaped, flake, spherical, or fibrous form. Examples of the amorphous carbon may include soft carbon (carbon sintered at low temperature), hard carbon, a mesophase pitch carbonization product, sintered coke, graphene, carbon black, fullerene soot, carbon nanotubes, carbon fibers, or a combination thereof. However, embodiments are not limited thereto, and any material suitable as an anode active material may be used.

The anode active material may include Si, $SiO_x$ (wherein 0<x<2, for example, 0.5<x<1.5), Sn, $SnO_2$, a silicon-containing metal alloy, or a combination thereof. The silicon-containing metal alloy may include, for example, silicon and at least one of Al, Sn, Ag, Fe, Bi, Mg, Zn, In, Ge, Pb, and Ti.

The anode active material may include a metal/metalloid alloyable with lithium, an alloy thereof, an oxide thereof, or a combination thereof. For example, the metal/metalloid alloyable with lithium may include Si, Sn, Al, Ge, Pb, Bi, Sb, a Si—Y' alloy (wherein Y' may be an alkali metal, an alkali earth metal, a Group 13 to Group 16 element, a transition metal, a rare earth element, or a combination thereof; but not Si), a Sn—Y' alloy (wherein Y' may be an alkali metal, an alkali earth metal, a Group 13 to Group 16 element, a transition metal, a rare earth element, or a combination thereof; but not Sn), or $MnO_x$ (wherein 0<x≤2). The element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. Examples of the oxide of the metal/metalloid alloyable with lithium may be a lithium titanium oxide, a vanadium oxide, and a lithium vanadium oxide, $SnO_2$, and $SiO_x$ (wherein 0<x<2). A combination comprising at least one of the foregoing may also be used.

For example, the anode active material may include at least one of a Group 13 to Group 16 element of the periodic table of elements. For example, the anode active material may Si, Ge, Sn, or a combination thereof.

In an embodiment, the anode may be a lithium metal electrode or a lithium metal alloy electrode.

The anode may include a lithium metal and a metal/metalloid alloyable with the lithium metal or an oxide thereof. The metal/metalloid alloyable with the lithium metal or an oxide thereof may include, for example, Si, Sn, Al, Ge, Pb, Bi, Sb, a Si—Y' alloy (wherein Y' may be an alkaline metal, an alkaline earth metal, a Group 13 element, a Group 14 element, a transition metal, a rare earth element, or a combination thereof, but is not Si), a Sn—Y' alloy (wherein Y' may be an alkaline metal, an alkaline earth metal, a Group 13 element, a Group 14 element, a transition metal, a rare earth element, or a combination thereof, but is not Sn), $MnO_x$ (wherein $0<x\leq2$), or a combination thereof. The Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal/metalloid alloyable with lithium metal may be a lithium titanium oxide, a vanadium oxide, a lithium vanadium oxide, $SnO_2$, $SiO_x$ (wherein $0<x<2$), or a combination thereof.

In some embodiments, the anode may include a lithium metal electrode or a lithium alloy electrode; or may include at least one of a carbonaceous material, silicon, a silicon oxide, a silicon-based alloy, a silicon-carbonaceous material composite, tin, a tin-based alloy, a tin-carbon composite, a metal oxide, or a combination thereof.

Figure 4:
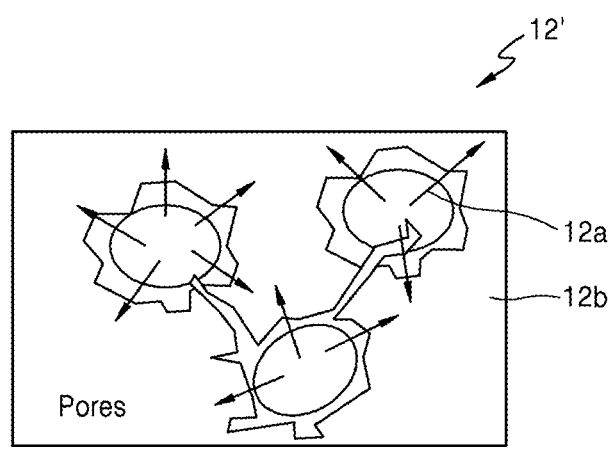
FIG. 4 is an illustration explaining an expansion mechanism of lithium metal particles in a composite electrolyte, when the lithium battery of FIG. 2B is an anodeless lithium metal battery.

FIG. 4 is an illustration of a detailed structure of lithium metal particles in a composite electrolyte according to an embodiment, and may be used to explain an expansion mechanism of the lithium metal particles in the composite electrolyte, when the lithium battery of FIG. 2B is an anodeless lithium metal battery. Referring to FIG. 4, in the anodeless lithium metal battery according to an embodiment, particles of the at least one of lithium metal and a lithium metal alloy in the composite electrolyte 12' may be present as independent lithium metal particles, and thus may freely expand in a radial direction, preventing loss of lithium during charging and discharging.

In a lithium metal battery, deposition of lithium ions occurs on a lithium metal thin film during charging. However, in the lithium metal battery according to one or more embodiments, the composite electrolyte may release lithium ions during discharging, while the lithium ions may migrate to the at least one of lithium metal and a lithium metal alloy in the composite electrolyte during charging, and are then deposited on a surface of the at least one of lithium metal and a lithium metal alloy. Through these processes the at least one of lithium metal and a lithium metal alloy may form an interconnected structure, and this interconnected structure may be bound to and/or disposed on at least one surface of the anode current collector.

In some embodiments, the liquid electrolyte of the composite electrolyte and the first electrolyte of the cathode may be different from one another. When the compositions of the liquid electrolyte and the first electrolyte are different from each other, the compositions of the liquid electrolyte and the first electrolyte may be optimized to compensate for electrochemical disadvantages in the lithium battery, such as, for example, high-voltage oxidation and electrolyte loss due to dendrite growth.

The first electrolyte of the cathode active material layer and the second electrolyte of the electrolyte reservoir layer may further include, in addition to the respective first and second ionic liquids, a polymer ionic liquid. The liquid electrolyte of the composite electrolyte may further include an ionic liquid, a polymer ionic liquid, or a combination thereof.

The first ionic liquid, the second ionic liquid, and the polymer ionic liquid may be any ionic material in a molten state at room temperature (25° C.), provided that the ionic liquid includes a cation and an anion. For example, the ionic liquid may include a cation including an imidazolium cation, an ammonium cation, a pyrrolidinium cation, a piperidinium cation, or a combination thereof. However, embodiments are not limited thereto. For example, the ionic liquid may include an anion including bis(fluorosulfonyl)imide, bis(fluorosulfonyl)amide, fluoroborate, fluorophosphates, or a combination thereof. However, embodiments are not limited thereto. Non-limiting examples of the cation include a cation of alkyl ammonium such as triethyl ammonium, a cation of imidazolium such as ethyl methyl imidazolium or butyl methyl imidazolium, a cation of pyrrolidium such as 1-methyl-1-propylpyrrolidium, a cation of methyl propylpiperidium, or a combination thereof. Non-limiting examples of the anion include an anion of bis(trifluoromethylsulfonyl)imide (TFSI), bis(pentafluoroethylsufonyl)imide (BETI), tetrafluoroborate ($BF_4$), orhexafluorophosphate ($PF_6$), or a combination thereof.

The ionic liquid may include, for example, [emim]Cl/$AlCl_3$ (wherein emim=ethyl methyl imidazolium), [bmpyr]$NTf_2$ (wherein bmpyr=butyl methyl pyridinium and Ntf=trifluoromethanesulfonamide), [bpy]Br/$AlCl_3$ (wherein bpy=4,4'-bipyridine), [choline]Cl/$CrCl_3.6H_2O$, [emim]OTf/[hmim]I (wherein emim=ethyl methyl imidazolium, hmim=hexyl methyl imidazolium, and OTf=trifluoromethane sulfonate), [choline]Cl/$HOCH_2CH_2OH$, [$Et_2MeN(CH_2CH_2OMe)$]$BF_4$ (wherein Et=ethyl, Me=methyl, Pr=propyl, Bu=butyl, Ph=phenyl, Oct=octyl, and Hex=hexyl), [$Bu_3PCH_2CH_2C_8F_{17}$]OTf (wherein OTf=trifluoromethane sulfonate), [bmim]$PF_6$ (wherein bmim=butyl methyl imidazolium), [bmim]$BF_4$ (wherein bmim=butyl methyl imidazolium), [omim]$PF_6$ (wherein omim=octyl methyl imidazolium), [$Oct_3PC_{18}H_{37}$]I (wherein Oct is octyl), [$NC(CH_2)_3mim$]$NTf_2$ (wherein mim=methyl imidazolium and Ntf=trifluoromethanesulfonamide), [$Pr_4N$][$B(CN)_4$], [bmim]$NTf_2$ (wherein bmim=butyl methyl imidazolium and Ntf=trifluoromethanesulfonamide), [bmim]Cl (wherein bmim=butyl methyl imidazolium), [bmim][$Me(OCH_2CH_2)_2OSO_3$] (wherein bmim=butyl methyl imidazolium and Me=methyl), [$PhCH_2mim$]OTf (wherein mim=methyl imidazolium, Ntf=trifluoromethanesulfonamide, and OTf=trifluoromethane sulfonate), [$Me_3NCH(Me)CH(OH)Ph$] $NTf_2$ (wherein Ntf=trifluoromethanesulfonamide, Me=methyl, and Ph=phenyl), [pmim][$(HO)_2PO_2$] (wherein pmim=propyl methyl imidazolium), [(6-Me)bquin]$NTf_2$ (wherein bquin=butyl quinolinium), [bmim][$Cu_2Cl_3$] (wherein bmim=butyl methyl imidazolium), [$C_{18}H_{37}OCH_2mim$]$BF_4$ (wherein mim=methyl imidazolium), [heim]$PF_6$ (wherein heim=hexyl ethyl imidazolium and Ntf=trifluoromethanesulfonamide), [$mim(CH_2CH_2O)_2CH_2CH_2mim$][$NTf_2$]$_2$ (wherein mim=methyl imidazolium), [obim]$PF_6$ (wherein obim=octyl butyl imidazolium), [oquin]$NTf_2$ (wherein oquin=octyl quinolinium and Ntf=trifluoromethanesulfonamide), [hmim][$PF_3(C_2F_5)_3$] (wherein hmim=hexyl methyl imidazolium), [$C_{14}H_{29}mim$]Br (wherein mim=methyl imidazolium), [$Me_2N(C_{12}H_{25})_2$]

NO₃, [emim]BF₄ (wherein emim=ethyl methyl imidazolium), [MeN(CH₂CH₂OH)₃], [MeOSO₃], [Hex₃PC₁₄H₂₉]NTf₂ (wherein Ntf=trifluoromethanesulfonamide), [emim][EtOSO₃] (wherein emim=ethyl methyl imidazolium and Et=ethyl), [choline][ibuprofenate], [emim]NTf₂ (wherein emim=ethyl methyl imidazolium and Ntf=trifluoromethanesulfonamide), [emim][(EtO)₂PO₂] (wherein emim=ethyl methyl imidazolium and Et=ethyl), [emim]Cl/CrCl₂ (wherein emim=ethyl methyl imidazolium), [Hex₃PC₁₄H₂₉]N(CN)₂ (wherein Hex=hexyl), or a combination thereof. However, embodiments are not limited thereto. Any material suitable as the ionic liquid in the art may be used.

The polymer ionic liquid may be a polymeric ionic compound comprising, consisting essentially of, or consisting of an organic cation including an imidazolium group, and an organic or inorganic anion. The cation of the polymer ionic liquid may include a cation of poly(1-vinyl-3-alkylimidazolium), a cation of poly(1-allyl-3-alkylimidazolium), a cation of poly(1-(meth)acryloyloxy-3-alkylimidazolium), or a combination thereof. The anion of the polymer ionic liquid may include $CH_3COO^-$, $CF_3COO^-$, $CH_3SO_3^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, $(CF_3SO_2)(CF_3CO)N^-$, or a combination thereof.

The polymer ionic liquid may include, for example, poly(1-vinyl-3-alkylimidazolium), poly(1-allyl-3-alkylimidazolium), poly(1-(meth)acryloyloxy-3-alkylimidazolium), or a combination thereof.

The at least one of lithium metal and a lithium metal alloy may have a size of about 5 μm to about 50 μm, and in some embodiments, about 10 μm to about 50 μm, or about 20 μm to about 50 μm. As used herein, the term "size" may refer to an average particle diameter when the at least one of lithium metal and a lithium metal alloy is provided as particles, or may refer to a length of the longest axis when the at least one of lithium metal and a lithium metal alloy is not provided as particles or is provided as non-spherical particles.

The size of the at least one of lithium metal and a lithium metal alloy may be measured by laser diffraction particle size distribution analysis (i.e., laser diffraction scattering). When the at least one of the lithium metal and the lithium metal alloy includes a coating on the surface thereof, the average particle diameter of the at least one of lithium metal and a lithium metal alloy refers to the size of the core of the particle, e.g., the size of the lithium particles without the coating layer.

The at least one of lithium metal and a lithium metal alloy may be treated so as to include a coating layer on a surface thereof, the coating layer being stable in air. The coating layer may include a coating material such as an organic rubber such as nitrile butadiene rubber (NBR) or styrene butadiene rubber (SBR), an organic resin such as an ethylene vinyl alcohol (EVA) copolymer resin, or an inorganic compound, for example, a metal carbonate such as $Li_2CO_3$ or $Li_2O$, or a metal oxide. A combination comprising at least one of the foregoing coating materials may also be used. When the at least one of lithium metal and a lithium metal alloy has such a coating layer, it may be possible to prevent highly reactive lithium (Li) from reacting with moisture present in the air or moisture present in a solvent and/or a dispersion medium.

The lithium metal alloy may include lithium (Li), and at least one of Si, Sn, Al, Ge, Pb, Bi, Sb, a Si—Y' alloy (wherein Y' may be an alkaline metal, an alkaline earth metal, a Group 13 element, a Group 14 element, a transition metal, a rare earth element, or a combination thereof, but is not Si), a Sn—Y' alloy (wherein Y' may be an alkaline metal, an alkaline earth metal, a Group 13 element, a Group 14 element, a transition metal, a rare earth element, or a combination thereof, but is not Sn), $MnO_x$ (wherein $0<x\leq2$), or a combination thereof. For example, the lithium alloy may be a lithium-aluminum (Li—Al) alloy, a lithium-magnesium alloy, a lithium-tin alloy, a lithium-indium alloy, a lithium-calcium alloy, a lithium-titanium alloy, or a lithium-vanadium alloy, or a combination thereof.

For example, the amount of the at least one of lithium metal and a lithium metal alloy may be about 1 part by weight to about 50 parts by weight, and in some embodiments, about 5 parts by weight to about 45 parts by weight, and in some other embodiments, about 10 parts t by weight to about 35 parts by weight, and in still other embodiments, about 15 parts by weight to about 25 parts by weight, with respect to 100 parts by weight of a total weight of the composite electrolyte. When the amount of the at least one of lithium metal and a lithium metal alloy is within these ranges, the lithium battery may have improved initial efficiency and capacity characteristics. In the lithium battery according to one or more embodiments, a separate step of coating an anode active material on the anode current collector is not needed, and thus, an energy density may be increased as desired by controlling the amount of the lithium metal added to the liquid electrolyte.

The organic solvent of the liquid electrolyte may further include a glyme compound, a dioxolane compound, a fluorinated ether compound, a sulfone compound, or a combination thereof.

In some embodiments, the first electrolyte of the cathode active material layer and the second electrolyte of the electrolyte reservoir layer may include any of the above-mentioned organic solvents of the liquid electrolyte, a carbonate compound, or a combination thereof.

For example, the glyme compound may include ethylene glycol dimethylether(1,2-dimethoxyethane), ethylene glycol diethylether(1,2-diethoxyethane), propylene glycol dimethylether, propylene glycol diethylether, butylene glycol dimethylether, butylene glycol diethylether, diethylene glycol dimethylether, triethylene glycol dimethylether, tetraethylene glycol dimethylether, diethyleneglycol diethylether, triethylene glycol diethylether, tetraethylene glycol diethylether, dipropylene glycol dimethylether, tripropylene glycol dimethylether, tetrapropylene glycol dimethylether, dipropylene glycol diethylether, tripropylene glycol diethylether, tetrapropylene glycol diethylether, dibutylene glycol dimethylether, tributylene glycol dimethylether, tetrabutylene glycol dimethylether, dibutylene glycol diethylether, tributylene glycol diethylether, and tetrabutylene glycol diethylether. For example, the fluorinated ether compound may be at least one selected from 1,1,2,2-tetrafluoroethyl 2,2,3,3-tetrafluoropropyl ether, and 2,2,3,3,4,4,5,5-octafluoropentyl 1,1,2,2-tetrafluoroethyl ether.

The dioxolane compound may include, for example, 1,3-dioxolane, 4,5-dimethyl-dioxolane, 4,5-diethyl-dioxolane, 4-methyl-1,3-dioxolane, 4-ethyl-1,3-dioxolane, 2-methyl-1,3-dioxolane, 2-vinyl-1,3-dioxolane, 2,2-dimethyl-1,3-dioxolane, 2-ethyl-2-methyl-1,3-dioxolane, or a combination thereof. The sulfone compound may include, for example, dimethyl sulfone, diethyl sulfone, ethylmethyl sulfone, or a combination thereof.

The carbonate compound may include, for example, ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, dibutyl carbonate, or a combination thereof.

The organic solvent may include, for example, a fluorinated ether compound.

The amount of the fluorinated ether compound may be about 50 vol. % or less, and in some embodiments, about 0.01 vol. % to about 50 vol. %, or about 0.1 vol. % to about 40 vol. %, and in some other embodiments, about 1 vol. % to about 30 vol. % based on a total amount of the organic solvent.

The fluorinated ether compound has a high flash point of about 80° C. or higher and excellent flame retardancy. When such a fluorinated ether compound is used as an organic solvent for a liquid electrolyte, a lithium metal battery having improved high-temperature stability may be manufactured. The fluorinated ether compound has a structure in which fluorinated functional groups are bonded to a R—$CH_2$—O— moiety, and have a relatively small polarity. Thus, the fluorinated ether compound may have excellent miscibility with an ether solvent capable of solvating lithium ions and having high dissolution capability, such as dimethyl ether (DME).

The fluorinated ether compound may be a compound represented by Formula 1.

R—$CH_2$—O—$C_nF_{2n}$H            Formula 1

In Formula 1, R may be $C_{m+1}H_mF_{2m}$ or $C_mF_{2m+1}$, n is an integer of 2 to 5, and m is an integer of 1 to 5

The fluorinated ether compound represented by Formula 1 may include $HCF_2CF_2CH_2OCF_2CF_2H$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, an $HCF_2CF_2OCH_2CH_2CH_2OCF_2CF_2CF_2H$, or a combination thereof.

The fluorinated ether compound represented by Formula 1 may include, for example, 1,1,2,2-tetrafluoroethyl 2,2,3,3-tetrafluoropropyl ether, 2,2,3,3,4,4,5,5-octafluoropentyl 1,1,2,2-tetrafluoroethyl ether, or a combination thereof.

The lithium salt may be any lithium salt that is suitably used to prepare electrolyte in the art. For example, the lithium salt may include LiSCN, $LiN(CN)_2$, $LiClO_4$, $LiBF_4$, $LiAsF_6$, $LiPF_6$, $LiCF_3SO_3$, $Li(CF_3SO_2)_2N$ (LiTFSI), $Li(CF_3SO_2)_3C$, $LiSbF_6$, $LiN(SO_2CF_3)_2$, $Li(FSO_2)_2N$ (LiFSI), $LiC_4F_9SO_3$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, LiCl, LiF, LiBr, LiI, $LiB(C_2O_4)_2$, lithium difluoro(oxalato)borate (LiFOB), bis(oxalato)borate (LiBOB), or a combination thereof.

The liquid electrolyte of the composite electrolyte and the first electrolyte of the composite cathode active material layer may each have a viscosity at 25° C. of about 60 centipoise (cP) or less, and in some embodiments, about 50 cP or less, and in some embodiments, about 30 cP or less, and in some other embodiments, about 10 cP or less, and in some other embodiments, about 5 cP or less, and in still other embodiments, about 0.01 cP to about 30 cP, or about 0.01 cP to about 10 cP, or about 0.01 cP to about 5 cP. When the liquid electrolyte and the first electrolyte have a viscosity within these ranges, ions may freely migrate in the liquid electrolyte or the first electrolyte, and ion conductivity may be improved. The liquid electrolyte and the first electrolyte may each have an ionic conductivity at 25° C. of about 1 milliSiemens per centimeter (mS/cm) or greater, or about 2 mS/cm or greater, or about 3 mS/cm or greater, and in some embodiments, about 1 mA/cm to about 10 mS/cm, or about 1 mS/cm to about 5 mS/cm or about 2 mS/cm to about 5 mS/cm.

The liquid electrolyte may further include, in addition to the above-listed organic solvents, at least one of γ-butyrolactone, succinonitrile, adiponitrile, benzonitrile, acetonitrile, tetrahydrofuran, 2-methyltetrahydrofuran, 4-methyl dioxolane, N,N-dimethylformamide, N,N-dimethylacetamide, dimethyl sulfoxide, dioxane, sulfolane, dichloroethane, chlorobenzene, and nitrobenzene.

The composite electrolyte may be, for example, in a gel or semi-solid form. When the composite electrolyte has a gel or semi-solid form, the at least one of lithium metal and a lithium metal alloy may be capable of freely expanding during charging and discharging, compared to when the composite electrolyte has a purely solid form.

Without being limited by theory, it is believed that the ability to freely expand during charging and discharging may solve the above-described drawbacks associated with a conventional lithium metal battery.

The composite electrolyte may include, for example, the at least one of lithium metal and a lithium metal alloy, and a liquid electrolyte.

In accordance with another aspect of the disclosure, a method of manufacturing the membrane-electrode assembly according to any of the embodiments is as follows.

First, a cathode may be formed by disposing a cathode active material layer on a cathode current collector, and then vacuum-impregnating the cathode active material layer with a first electrolyte containing a high concentration of a lithium salt, a first ionic liquid, and a sacrificial solvent.

The sacrificial solvent may be a material having a low boiling point and low reactivity to a binder present in the cathode. For example, the sacrificial solvent may be a material having a boiling point of about 80° C. or less, or about 75° C. or less, or about 70° C. or less, such as a fluorinated ether compound or tetrahydrofuran. When the sacrificial solvent is combined with the lithium salt and the first ionic liquid to prepare the first electrolyte, a relatively high viscosity of the first electrolyte, which is high due to the inclusion of the first ionic liquid, may be appropriately controlled. By controlling the viscosity of the first electrolyte using the sacrificial solvent, the ability of the first electrolyte to effectively impregnate the composite cathode may be improved.

Accordingly, the sacrificial solvent may not be substantially present in the composite cathode active material layer after being impregnated into the cathode active material layer of the cathode. The amount of the sacrificial solvent may be about 0.1 vol. % to about 90 vol. %, and in some embodiments, about 5 vol. % to about 85 vol. %, and in some other embodiments, about 10 vol. % to about 80 vol. % based on 100 parts by volume of a total volume of the first ionic liquid and the sacrificial solvent. When the amount of the first ionic liquid is within these ranges, the lithium battery may have improved conductivity and safety.

The first electrolyte may be vacuum-impregnated into the cathode active material layer under a vacuum condition at a temperature of about 30° C. to about 60° C.

Next, an electrolyte reservoir layer composition may be prepared by mixing a polymer (e.g., a non-ionically conductive polymer) and a second ionic liquid.

The polymer may be combined with an organic solvent to prepare a mixture prior to adding the polymer to the second ionic liquid. The mixture of the polymer and the organic solvent may provide a polymer solution. By mixing the polymer solution with the second ionic liquid, the electrolyte reservoir layer composition, including a uniform mixture of the polymer and the second ionic liquid, may be obtained without a gelation process.

The electrolyte reservoir layer composition may further include an organic solvent. This organic solvent may be the same as the organic solvent that is mixed with the polymer and the sacrificial solvent of the first electrolyte. The organic solvent may be, for example, tetrahydrofuran or a fluorinated ether compound. The amount of the organic solvent may be about 100 parts by weight to about 3,000 parts by weight based on 100 parts by weight of the polymer.

Next, the electrolyte reservoir layer composition may be coated on a surface of the composite cathode and then dried, thereby forming the electrolyte reservoir layer containing the second electrolyte. The second electrolyte may include a polymer (e.g., a non-ionically conductive polymer) and a second ionic liquid.

The electrolyte reservoir layer may have a thickness of about 1 µm to about 15 µm, or about 1 µm to about 12 µm, and in some embodiments, about 2 µm to about 10 µm. When the electrolyte reservoir layer has a thickness within these ranges, an interfacial resistance between the solid electrolyte and the cathode may be reduced.

Next, a solid electrolyte may be disposed on at least one surface of the electrolyte reservoir layer thereby manufacturing the membrane-electrode assembly according to an embodiment.

In some embodiments, the composite electrolyte may be prepared by disposing a composition for forming the composite electrolyte onto the anode current collector and drying the resulting product.

The anode current collector may be a mesh-type current collector. When using a mesh-type current collector as the anode current collector, the anode current collector may be effectively impregnated with the composite electrolyte. Accordingly, the composite electrolyte may not include a non-woven fabric.

The composition for forming the composite electrolyte may be prepared by mixing the at least one of lithium metal and a lithium metal alloy with a liquid electrolyte.

The composition for forming the composite electrolyte may have a gel or semi-solid form. The composition may have a viscosity at 25° C. of about 5 cP or less, or about 4.5 cP or less, or about 4 cP or less, and in some embodiments, about 1 cP to about 5 cP, or about 2 cP to about 4.5 cP, or about 4 cP or less, or about 3 cP or less, and in some embodiments, about 1 cP to about 5 cP, or about 2.5 cP to about 4.0 cP, but the viscosity of the composition is not limited thereto.

Optionally, after the disposing of the composition for forming the composite electrolyte onto the anode current collector, a non-woven fabric may be disposed thereon.

Then, the membrane-electrode assembly according to any of the above-described embodiments may be stacked on the resulting anode structure, thereby manufacturing a lithium battery according to an embodiment. The lithium battery may be a lithium metal battery.

In the lithium metal battery according to one or more embodiments, the lithium from the metal particle including at least one of metal or a lithium metal alloy may be deposited on the anode current collector during charge. The deposited lithium may have an interconnected network structure that is formed upon charge of the anodeless lithium metal battery. Conventional lithium anode thin film do not have a free volume before and after charging, and are expanded upward and downward, resulting in more stress due to dendrite formation. Unlike the lithium anode thin film that may only expand in an upper or lower direction, the metal particle in the anodeless lithium metal battery may expand in a radial direction as shown in FIG. 4, leading to nearly zero stress, thus improving energy density and reducing an expansion rate of the battery after charging and discharging.

In the lithium metal battery according to one or more embodiments, the interconnected structure of the lithium metal and/or the lithium metal alloy may be in the form of particles or a layer on at least one surface of the anode current collector. The interconnected structure of the lithium metal and/or the metal lithium alloy may be in the form of a continuous or discontinuous layer. When the interconnected structure of the lithium metal and/or the lithium metal alloy forms a layer on the anode current collector, a thickness of the layer may be about 10% or less, and in some embodiments, about 5% or less, and in some other embodiments, about 2% or less, and in still other embodiments, about 1% or less, and in yet other embodiments, about 0.1% to about 1%, about 0.1 to about 10%, or about 0.1 to about 5%, with respect to a total thickness of the cathode.

In the anodeless lithium metal battery according to one or more embodiments, a lithium metal layer may not be formed on the anode current collector after charging and discharging of the anodeless lithium metal battery. The lithium metal layer may be a continuous or discontinuous layer.

In some embodiments, the cathode active material layer may be formed by directly coating, on the cathode current collector, a composition for forming the cathode active material layer which may be obtained by mixing a cathode active material, a conducting agent, a binder, and a solvent together. In some other embodiments, the composition for forming the cathode active material may be cast on a separate support to form a cathode active material layer. This cathode active material layer may then be separated from the support and laminated on the cathode current collector, thereby forming the composite cathode.

In some embodiments, the cathode active material may be a lithium composite oxide. Any suitable lithium composite oxide may be used without limitation. For example, the lithium composite oxide may include a composite oxide of lithium with a metal selected from cobalt, manganese, nickel, or a combination thereof. In some embodiments, the lithium composite oxide may be a compound represented by one of the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. A combination comprising at least one of the foregoing lithium composite oxides may also be used.

The compounds listed above as the lithium composite oxide may be uncoated or may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element selected from an oxide, a hydroxide, an oxyhydroxide, an oxycarbonate, and a hydroxyl carbonate of the coating element. In some embodiments, the compounds for forming the coating layer may be amorphous or crystalline. In some embodiments, the coating element for forming the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical characteristics of the cathode active material when a compound of the coating element is used. For example, the coating layer may be formed on a surface of the lithium composite oxide using spray coating or dipping. Any suitable coating method may be used and may be determined by those of ordinary skill in the art, and thus a detailed description thereof will be omitted.

The cathode active material may be, for example, a nickel-based active material represented by Formula 2.

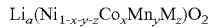

$$Li_a(Ni_{1-x-y-z}Co_xMn_yM_z)O_2 \quad \text{Formula 2}$$

In Formula 2, M may be an element including boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof and $x \le (1-x-y-z)$, $y \le (1-x-y-z)$, $0 < x < 1$, $0 \le y < 1$, and $0 \le z < 1$. In the nickel based active material of Formula 2, the amount of Ni may be greater than the amount of Co and the amount of Mn. In Formula 2, $0.95 \le a \le 1.3$, $0 < x \le 0.3$, $0 \le y \le 0.5$, $0 \le z \le 0.05$, and $0.5 \le (1-x-y-z) \le 0.95$. In Formula 2, a may be, for example, from 1 to 1.1; x may be from 0.1 to 0.3; y may be from 0.05 to 0.3. In some embodiments, in Formula 2, z may be 0. In some other embodiments, in Formula 2, M may be aluminum (Al) when $0 < z \le 0.05$.

In the nickel based active material, the amount of Ni may be greater than the amount of each transition metal based on 1 mole of the total transition metals. When such a nickel based active material having a high nickel content is used, a lithium battery including a composite cathode containing the nickel based active material may have an increased degree of diffusion of lithium, a high conductivity, and an increased capacity at the same voltage. The cathode active material may be, for example, $LiNi_{0.6}CO_{0.2}Mn_{0.2}O_2$, $LiNi_{0.5}Co_{0.2}Mn_{0.3}O_2$, $LiNi_{1/3}CO_{1/3}Mn_{1/3}O_2$, $LiNi_{0.8}Co_{0.1}Mn_{0.1}O_2$, $LiNi_{0.85}Co_{0.1}Al_{0.05}O_2$, or a combination thereof.

Non-limiting examples of the conducting agent may include: carbon black; graphite particle; natural graphite; artificial graphite; acetylene black; Ketjen black; carbon fiber; carbon nanotube; metal powder, metal fiber or metal tube of copper, nickel, aluminum, and silver; a conductive polymer such as polyphenylene derivative, or a combination thereof. However, embodiments are not limited thereto. Any conducting agents suitable for use in a lithium battery may be used.

Non-limiting examples of the binder may include vinylidene fluoride/hexafluoropropylene copolymers, polyvinylidene fluoride, polyimide, polyethylene, polyester, polyacrylonitrile, polymethyl methacrylate, polytetrafluoroethylene (PTFE), carboxymethyl cellulose/styrene-butadiene rubber (SMC/SBR) copolymers, styrene butadiene rubber-based polymers, or a combination thereof. However, embodiments are not limited thereto. Any suitable binders may be used.

For example, the solvent may be N-methyl-pyrrolidone, acetone or water. However, examples of the solvent are not limited thereto. Any suitable solvent may be used.

The amounts of the cathode active material, the conducting agent, the binder, and the solvent are limited only to those amounts suitable for lithium metal batteries, and may be determined by those of skill in the art without undue experimentation. At least one of the conducting agent, the binder, and the solvent may be omitted depending on the desired use and structure of a lithium metal battery.

The anodeless lithium metal battery according to one or more embodiments may further include a separator.

For example, the separator may be a single-layer structure, or a multi-layer structure, and may include at least one layer of polyethylene, polypropylene, polyvinylidene fluoride, or a combination thereof. For example, the separator may be a mixed multilayer separator, such as a two-layer separator of polyethylene/polypropylene, a three-layer separator of polyethylene/polypropylene/polyethylene, or a three-layer separator of polypropylene/polyethylene/polypropylene.

A battery case may have a cylindrical, rectangular, pouch, or thin film shape. For example, the lithium battery according to one or more embodiments may be a large thin-film type battery. For example, the lithium battery according to one or more embodiments may be a lithium ion battery or a lithium metal battery including lithium metal as an anode. For example, the lithium metal battery according to one or more embodiments may be a lithium air battery, a lithium sulfur battery, or the like.

The lithium battery according to any of the above-described embodiments may have improved lifetime characteristics and high rate characteristics, and thus may be used in, for example, electric vehicles (EVs). For example, the lithium metal battery may be used in hybrid vehicles such as plug-in hybrid electric vehicles (PHEV) or the like.

The lithium metal battery may also be used in fields where the storage of a large amount of power is beneficial. For example, the lithium metal battery may be used in electric bikes, power tools, and the like.

One or more embodiments of the present disclosure will now be described in detail with reference to the following examples. However, these examples are only for illustrative purposes and are not intended to limit the scope of the one or more embodiments of the present disclosure.

EXAMPLES

Example 1: Lithium Metal Battery

After a composition for forming a composite electrolyte was supplied onto a copper foil used as an anode current collector, a cellulose non-woven fabric was disposed thereon, and the resulting structure was dried to form the composite electrolyte (having a thickness of about 30 μm) on the anode current collector.

The composition for forming the composite electrolyte was prepared by mixing 3.5 M of a liquid electrolyte, which was obtained by mixing lithium bis(fluorosulfonyl)imide (LiFSI) with dimethylether (DME), with lithium metal powder (having a particle size of about 50 μm). The amount of the lithium metal powder was about 20 parts by weight with respect to 100 parts by weight of a total weight of the composite electrolyte (i.e., a total weight of the lithium salt, the organic solvent, and the lithium metal powder).

A cathode was manufactured as follows. $LiNi_{0.6}Co_{0.2}Mn_{0.2}O_2$, a conducting agent (Super-P, available from Timcal Ltd.), polyvinylidene fluoride (PVdF), and N-methyl pyrrolidone were mixed to obtain a cathode active material layer composition. A mixed weight ratio of $LiNi_{0.6}CO_{0.2}Mn_{0.2}O_2$, the conducting agent, and the PVdF in the cathode active material layer composition was about 97:1.5:1.5.

The cathode active material layer composition was coated on the aluminum foil (having a thickness of about 15 μm) and dried at about 25° C., then further under vacuum at about 110° C., thereby manufacturing the cathode.

1-methyl-1-propylpyrrolidinium bis(fluorosulfonyl)imide (PY13FSI) as a first ionic liquid, lithium bis(fluorosulfonyl)imide (LiFSI) as a lithium salt, a fluorinated ether compound as a sacrificial solvent, and 1,1,2,2-tetrafluoroethyl 2,2,3,3-tetrafluoropropyl ether as a fluorinated ether compound used for a sacrificial solvent, were mixed together to prepare a first electrolyte containing a high-concentration of lithium salt. In the first electrolyte, a concentration of the lithium salt was 2 M, and the amount of PY13FSI used as the first ionic liquid was about 50 vol. % based on a total volume of the PY13FSI and the fluorinated ether compound.

The first electrolyte was impregnated into the cathode active material layer under vacuum at 1 torr (133 pascals (Pa)) at about 50° C. for about 2 hours, thereby manufacturing the composite cathode active material layer having a thickness of about 80 μm.

A solution of about 10 weight percent (wt %) polyvinylindene fluoride (PVDF) in tetrahydrofuran was added to PY13FSI as a second ionic liquid and mixed together to obtain an electrolyte reservoir layer composition. This electrolyte reservoir layer composition was coated on the composite cathode active material layer of the cathode by blade coating, and then dried to form the electrolyte reservoir layer having a thickness of about 3 μm on the cathode. The amount of PY13FSI used as the second ionic liquid was about 80 wt % based on a total weight of the PY13FSI and the polyvinylindene fluoride, the amount of the polyvinylindene fluoride was about 20 wt % based on the total weight of the PY13FSI and the polyvinylindene fluoride, and the amount of the tetrahydrofuran was about 20 wt % based on the total weight of the electrolyte reservoir layer The total weight of the PY13FSI and the polyvinylindene fluoride was about 80 wt % based on a total weight of the electrolyte reservoir layer composition.

A LTAP ($Li_{1.4}Ti_{1.6}Al_{0.4}P_3O_{12}$) membrane having a thickness of about 90 μm was disposed between the cathode and the composite electrolyte on the anode current collector, and then assembled together, thereby manufacturing a lithium metal battery.

Examples 2 and 3: Lithium Metal Battery

Lithium metal batteries were manufactured in the same manner as in Example 1, except that the concentration of LiFSI used as the lithium salt of the first electrolyte in forming the composite cathode was varied from 2 M to about 1.3 M (Example 2) and about 4 M (Example 3), respectively.

Examples 4 and 5: Lithium Metal Battery

Lithium metal batteries were manufactured in the same manner as in Example 1, except that the thickness of the electrolyte reservoir layer was varied to about 1 μm (Example 4) and about 10 μm (Example 5), respectively.

Example 6: Anodeless Lithium Metal Battery

An anodeless lithium metal battery was manufactured in the same manner as in Example 1, except that ethyl methyl imidazolium bis(fluorosulfonyl)imide (EMI-FSI), instead of PY12FSI, was used as the lithium salt of the first electrolyte in forming the composite cathode active material layer.

Example 7: Anodeless Lithium Metal Battery

An anodeless lithium metal battery was manufactured in the same manner as in Example 1, except that a styrene-butadiene rubber, instead of polyvinylindene fluoride, was used in forming the electrolyte reservoir layer.

Comparative Example 1: Lithium Metal Battery

A lithium metal battery was manufactured in the same manner as in Example 1, except that polyethylene oxide (PEO) was used as a polymer in forming the electrolyte reservoir layer.

The lithium metal battery of Comparative Example 1, including the electrolyte reservoir layer using the PEO, was found to have insufficient ion conductivity and oxidation resistance (4.0 V or less with respect to lithium), and thus had poor current density and stability characteristics.

Evaluation Example 1: Scanning Electron Microscopy

The structure including the cathode and LTAP membrane in the lithium metal battery manufactured in Example 1 were analyzed by scanning electron microscopy. The results are shown in FIG. 5.

Figure 5:
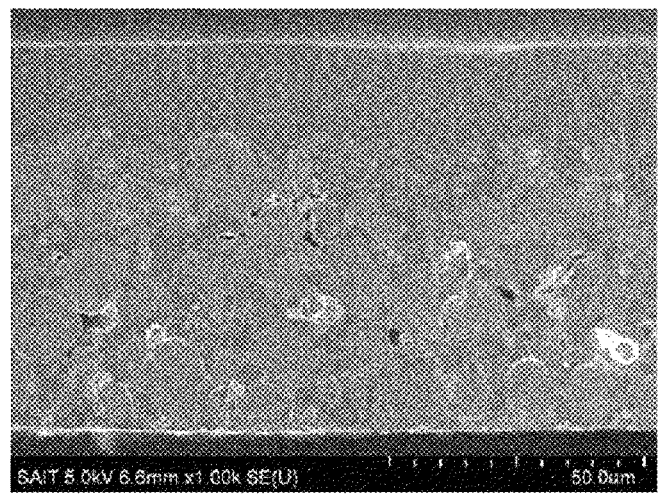
FIG. 5 is a scanning electron microscope (SEM) image of a cathode and an electrolyte construct in the lithium metal battery of Example 1.

Referring to FIG. 5, the electrolyte reservoir layer was found to be between the composite cathode and the LTAP membrane.

Evaluation Example 2: Charge-Discharge Characteristics

The lithium metal battery of Example 1 was charged at about 25° C. with a constant current of 0.1 C rate until a voltage of about 4.30 V (with respect to Li) was reached, and then with a constant voltage of 4.30 V until a cutoff current of 0.05 C rate was reached, and then discharged with a constant current of 0.1 C rate to a voltage of about 2.8 V (with respect to Li) (Formation process, $1^{st}$ cycle). This charging and discharging process was performed two additional times to complete the formation process.

After the formation process, the lithium metal battery was charged at room temperature (25° C.) with a constant current of i) 0.5 C or ii) 1 C in a voltage range of about 3.0 V to 4.4 V (with respect to Li) and then discharged with a constant current of 0.2 C (0.72 mA) until a cutoff voltage of 3.0 V was reached. This charging and discharging cycle was repeated 130 times in total. A Coulombic efficiency was calculated using Equation 1.

Coulombic efficiency (%)=(Discharge capacity of each cycle/Charge capacity of each cycle)× 100%  Equation 1

Figure 6:
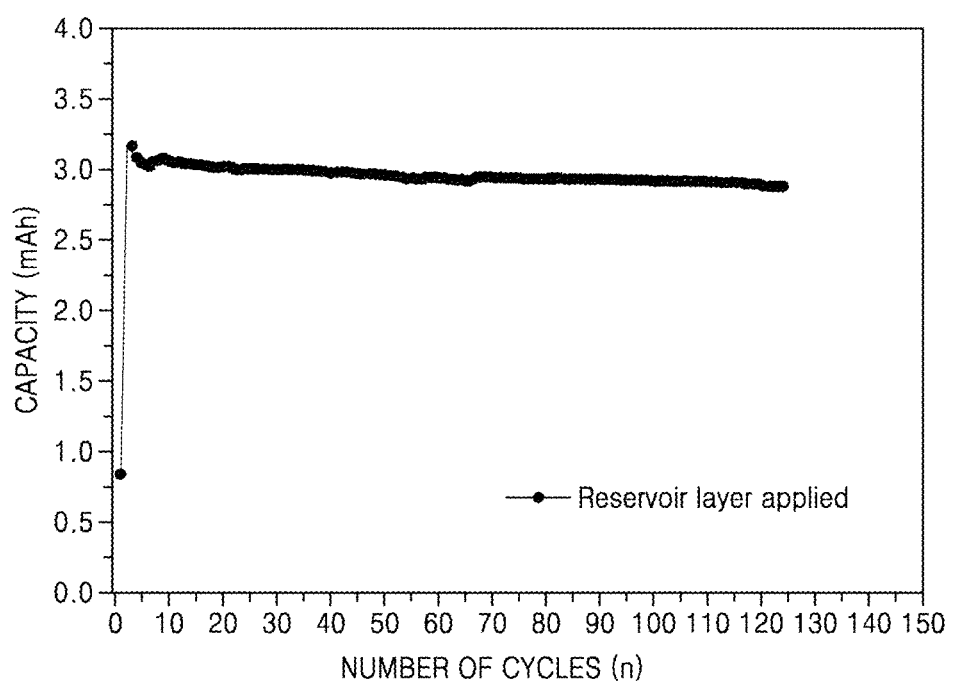
FIG. 6 is a graph of capacity (milliampere hours, mAh) versus the number of charge/discharge cycles (n) for the lithium metal battery of Example 1.
Figure 7:
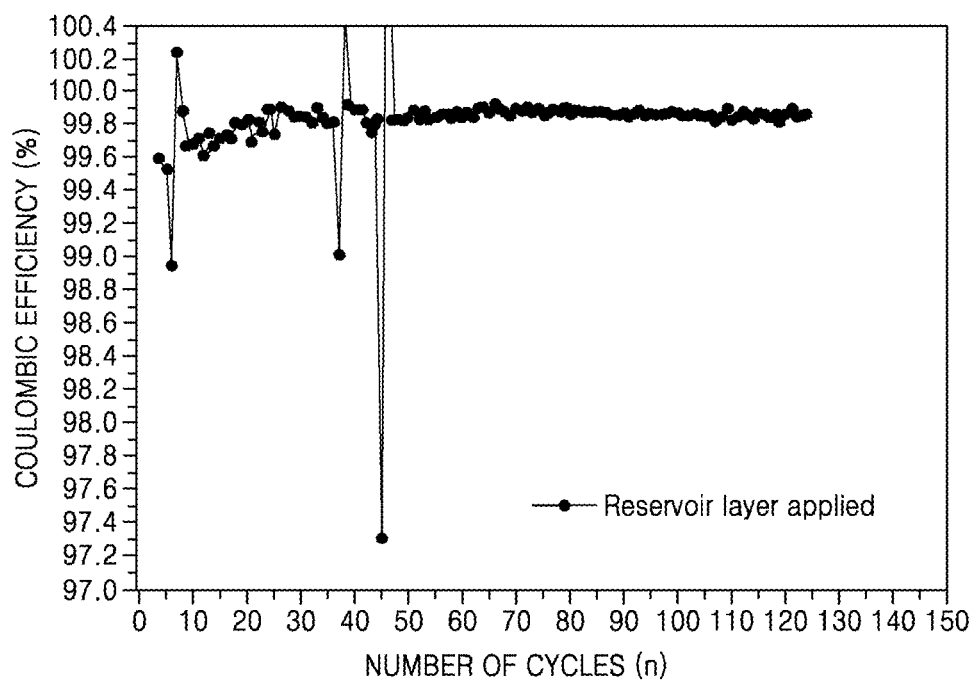
FIG. 7 is a graph of Coulombic efficiency (%) versus the number of charge/discharge cycles for the lithium metal battery of Example 1.

The evaluation results of the charge-discharge characteristics are shown in FIGS. 6 and 7. FIGS. 6 and 7 show changes in capacity and Coulombic efficiency, respectively, with respect to the number of cycles in the lithium metal battery of Example 1.

Referring to FIGS. 6 and 7, the lithium metal battery of Example 1 was found to have extended lifetime characteristics with a small amount of electrolyte, due to the electrolyte reservoir layer formed on a surface of the composite cathode as the high-viscosity electrolyte was impregnated into the composite cathode.

Charge-discharge characteristics of the lithium metal batteries of Examples 2 to 7 were evaluated using the same method as applied to the lithium metal battery of Example 1.

As a result of the evaluation, the lithium metal batteries of Examples 3 to 8 were found to have equivalent or similar charge-discharge characteristics to those of the lithium metal battery of Example 1.

Evaluation Example 3: Rate Capability

Rate capability of the lithium metal battery of Example 1 was evaluated using the following method.

The lithium metal battery of Example 1 was charged with a constant current (0.2 C) and a constant voltage (4.3 V, 0.05 C cut-off). After a rest for about 10 minutes, the lithium metal battery was discharged with a constant current (0.1 C, 0.5 C, or 1 C) until a voltage of about 3.0 V was reached. In particular, with periodic charging of discharge rate to 0.1 C, 0.5 C, or 1 C at every increase in charge and discharge cycle number, high-rate discharge characteristics (referred to also as "rate capability") of each coin cell were evaluated. During the $1^{st}$ charge and discharge cycle, each lithium metal battery was discharged at a rate of 0.1 C.

Figure 8:
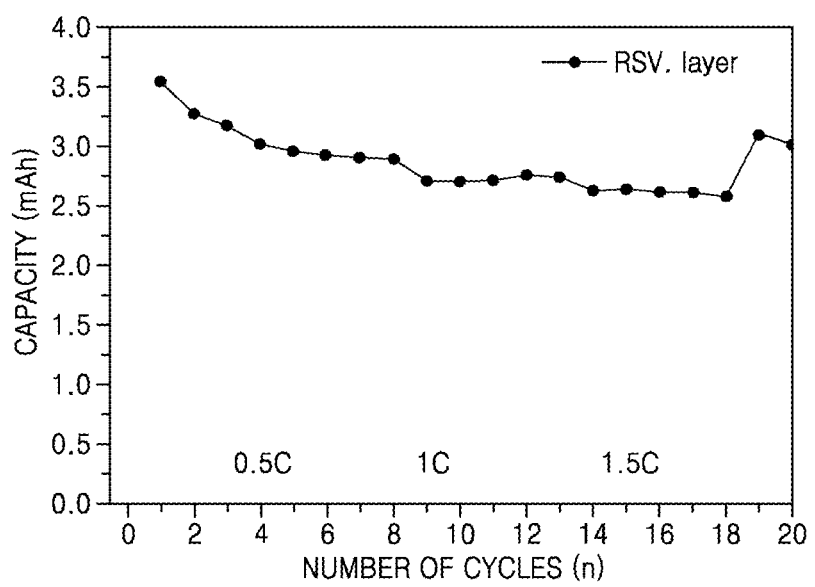
FIG. 8 is a graph of capacity (mAh) versus number of charge/discharge cycles, illustrating the results of evaluating rate capability of the lithium metal battery of Example 1.

The evaluation results of rate capability of each cell are shown FIG. 8.

Referring to FIG. 8, the lithium metal battery of Example 1 was found to excellent rate capabilities both at 0.5 C and 1.5 C.

As described above, according to the one or more embodiments, a lithium battery may have reduced resistance between a high-energy density composite cathode and a solid electrolyte, and thus improved safety. The lithium battery may overcome a problem such as reduction in charge and discharge efficiency, and thus have improved energy density, lifetime characteristics, and high-rate characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A membrane-electrode assembly for a lithium battery comprising:
   a cathode comprising a cathode current collector and a composite cathode active material layer on the cathode current collector, wherein the composite cathode active material layer comprises a cathode active material and a first electrolyte comprising a lithium salt and a first ionic liquid;
   an electrolyte reservoir layer on a surface of the cathode, wherein the electrolyte reservoir layer comprises a second electrolyte comprising a polymer and a second ionic liquid; and
   a solid electrolyte on a surface of the electrolyte reservoir layer,
   wherein a concentration of the lithium salt in the first electrolyte is about 1.3 molar to about 10 molar.

2. The membrane-electrode assembly of claim 1, wherein the polymer comprises polyvinylidene fluoride, a vinylidene fluoride-hexafluoropropylene copolymer, a styrene-butadiene rubber, polyvinyl alcohol, polyurethane, polyamideimide, or a combination thereof.

3. The membrane-electrode assembly of claim 1, wherein the electrolyte reservoir layer has a thickness of about 1 micrometer to about 10 micrometers.

4. The membrane-electrode assembly of claim 1, wherein an amount of the second ionic liquid in the second electrolyte is about 50 parts by weight to about 95 parts by weight, based on 100 parts by weight of a total weight of the second ionic liquid and the polymer.

5. The membrane-electrode assembly of claim 1, wherein the lithium salt comprises LiSCN, $LiN(CN)_2$, $Li(CF_3SO_2)_3C$, $LiN(FSO_2)_2$, $LiC_4F_9SO_3$, $LiN(SO_2CF_2CF_3)_2$, $LiPF_3(C_2F_5)_3$, LiCl, LiF, LiBr, LiI, $LiB(C_2O_4)_2$, $LiPF_6$, $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_3(CF_2CF_3)_3$, $LiPF_4(C_2O_4)_2$, $LiBF_4$, $LiBF_3(C_2F_5)$, lithium bis(oxalato) borate, lithium oxalyldifluoroborate, lithium difluoro(oxalato)borate, lithium bis(trifluoro methanesulfonyl) imide, $LiN(SO_2CF_3)_2$, $LiN(SO_2C_2F_5)_2$, $LiCF_3SO_3$, $LiAsF_6$, $LiSbF_6$, $LiClO_4$, or a combination thereof.

6. The membrane-electrode assembly of claim 1, wherein the solid electrolyte comprises
   an inorganic solid electrolyte, an organic solid electrolyte, an organic/inorganic composite electrolyte, or a combination thereof,
   the organic solid electrolyte comprises a polyethylene derivative, a polyethylene oxide derivative, a polypropylene oxide derivative, a phosphoric acid ester polymer, a polyester sulfide, polyvinyl alcohol, polyvinylidene fluoride, or a combination thereof,
   the inorganic solid electrolyte comprises a glass active metal ionic conductor, an amorphous active metal ionic conductor, a ceramic active metal ionic conductor, and a glass-ceramic active metal ionic conductor, or a combination thereof, and the organic/inorganic composite electrolyte comprises a combination of the organic solid electrolyte and the inorganic solid electrolyte.

7. The membrane-electrode assembly of claim 1, wherein the solid electrolyte comprises $Li_{1+x}Ti_{2-x}Al(PO_4)_3$ wherein $0 \leq x < 4$, a Li—Ge—P—S material, $Li_{1+x+y}Al_x Ti_{2-x}Si_yP_{3-y}O_{12}$ wherein $0 < x < 2$ and $0 \leq y < 3$, $BaTiO_3$, $Pb(Zr_{(1-a)}Ti_a)O_3$ wherein a is $0 \leq x \leq 1$, $Pb_{1-x}La_xZr_{1-y}Ti_yO_3$ wherein $0 \leq x < 1$ and $0 \leq y < 1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0 < x < 2$, and $0 < y < 3$, $Li_xAl_yTi_z(PO_4)_3$ wherein $0 < x < 2$, $0 < y < 1$, and $0 < z < 3$, $Li_{1+x+y}(Al_{1-a}Ga_a)_x (Ti_{1-b}Ge_b)_{2-x}Si_yPO_{12}$ wherein $0 \leq x \leq 1$, $0 \leq y \leq 1$, $0 \leq a \leq 1$, and $0 \leq b \leq 1$, $Li_xLa_yTiO_3$ wherein $0 < x < 2$ and $0 < y < 3$, $Li_xGe_yP_zS_w$, wherein $0 < x < 4$, $0 < y < 1$, $0 < z < 1$, and $0 < w < 5$, $Li_xN_y$ wherein $0 < x < 4$ and $0 < y < 2$, a $Li_xSi_yS_z$ glass wherein $0 < x < 3$, $0 < y < 2$, and $0 < z < 4$, a $Li_xP_yS_z$ glass wherein $0 < x < 3$, $0 < y < 3$, and $0 < z < 7$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$-containing ceramic, and a garnet ceramic having the formula $Li_{3+x}La_3M_2O_{12}$, wherein $0 \leq x \leq 5$ and M comprises Te, Nb, Zr, or a combination thereof; or a combination thereof.

8. A lithium battery comprising:
the membrane-electrode assembly of claim 1;
a composite electrolyte on the membrane-electrode assembly, the composite electrolyte comprising
at least one of lithium metal and a lithium metal alloy, and
a liquid electrolyte; and
an anode current collector on the composite electrolyte.

9. The lithium battery of claim 8, wherein the at least one of lithium metal and the lithium alloy has a particle size of about 5 micrometers to about 50 micrometers, and an amount of the at least one of lithium metal and the lithium metal alloy is about 1 part by weight to about 50 parts by weight, based on 100 parts by weight of a total weight of the composite electrolyte.

10. The lithium battery of claim 8, wherein the lithium metal alloy comprises lithium and Si, Sn, Al, Ge, Pb, Bi, Sb, a Si—Y' alloy wherein Y' is an alkaline metal, an alkaline earth metal, a Group 13 element, a Group 14 element, a transition metal, a rare earth element, or a combination thereof, and is not Si, a Sn—Y' alloy wherein Y' is an alkaline metal, an alkaline earth metal, a Group 13 element, a Group 14 element, a transition metal, a rare earth element, or a combination thereof, and is not Sn, $MnO_x$ wherein $0 < x \leq 2$, or a combination thereof.

11. The lithium battery of claim 8, wherein the liquid electrolyte comprises a lithium salt and an organic solvent, and the organic solvent comprises a glyme compound, a dioxolane compound, a fluorinated ether compound, a sulfone compound, or a combination thereof.

12. The lithium battery of claim 11, wherein the organic solvent comprises the fluorinated ether compound, and an amount of the fluorinated ether compound is about 50 volume percent or less based on a total volume of the organic solvent.

13. The lithium battery of claim 8, wherein the composite electrolyte is in a liquid or gel form, and the composite electrolyte comprises a non-woven fabric, wherein the non-woven fabric comprises cellulose, polyester, polyetherimide, polyethylene, polypropylene, polyethylene terephthalate, polybutylene terephthalate, polyamide, polyacetal, polycarbonate, polyimide, polyether ketone, polyether sulfone, polyphenylene oxide, polyphenylene sulfide, polyethylene naphthalate, polytetrafluoroethylene, polyvinylindene fluoride, polyvinyl chloride, polyacrylonitrile, nylon, polyparaphenylene benzobisoxazole, or a combination thereof.

14. The lithium battery of claim 8, wherein the liquid electrolyte comprises a lithium salt, and a concentration of the lithium salt in the liquid electrolyte is about 1 molar to about 8 molar.

15. The lithium battery of claim 11, wherein the lithium salt comprises LiSCN, $LiN(CN)_2$, $Li(CF_3SO_2)_3C$, $Li(FSO_2)_2N$, $LiC_4F_9SO_3$, $LiN(SO_2CF_2CF_3)_2$, $LiPF_3(C_2F_5)_3$, LiCl, LiF, LiBr, LiI, $LiB(C_2O_4)_2$, $LiPF_6$, $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_3(CF_2CF_3)_3$, $LiPF_4 (C_2O_4)_2$, $LiBF_4$, $LiBF_3(C_2F_5)$, lithium bis(oxalato)borate, lithium oxalyldifluoroborate, lithium difluoro(oxalato)borate, lithium bis(trifluoro methanesulfonyl)imide, $LiN(SO_2CF_3)_2)$, $LiN(SO_2C_2F_5)_2$, $LiCF_3SO_3$, $LiAsF_6$, $LiSbF_6$, $LiClO_4$, or a combination thereof.

16. The lithium battery of claim 8, wherein the at least one of lithium metal and the lithium alloy in the composite electrolyte comprises a lithium metal powder, a lithium alloy powder, or a combination thereof.

17. The lithium battery of claim 8, wherein the composite electrolyte further comprises a non-woven fabric, and has a thickness of about 10 μm to about 150 μm.

18. The lithium battery of claim 8, further comprising a porous polymer membrane, wherein the porous polymer membrane comprises a polyethylene membrane, a polypropylene membrane, a polyethylene terephthalate membrane, a polybutylene terephthalate membrane, a polyester membrane, a polyacetal membrane, a polyamide membrane, a polycarbonate membrane, a polyimide membrane, a polyether ketone membrane, a polyether sulfone membrane, a polyphenylene oxide membrane, a polyphenylene sulfide membrane, a polyethylene naphthalene membrane, or a combination thereof.

19. A lithium battery comprising:
the membrane-electrode assembly of claim 1;
anode active material layer on the membrane-electrode assembly; and
an anode current collector on the anode active material layer.

20. A method of manufacturing the membrane-electrode assembly of claim 1, the method comprising:
providing a cathode active material layer on a cathode current collector; vacuum-impregnating a first electrolyte composition into the cathode active material layer, wherein the first electrolyte composition comprises a first ionic liquid, a sacrificial solvent, and the lithium salt and removing the sacrificial solvent to form a composite cathode active material layer;
disposing an electrolyte reservoir layer composition onto a surface of the composite cathode active material layer to form an electrolyte reservoir layer comprising a second electrolyte, wherein the electrolyte reservoir layer composition comprises a mixture of a polymer and a second ionic liquid; and
disposing a solid electrolyte on a surface of the electrolyte reservoir layer to manufacture the membrane-electrode assembly.

* * * * *